United States Patent
Li

(10) Patent No.: US 12,376,080 B2
(45) Date of Patent: Jul. 29, 2025

(54) RANDOM ACCESS RESOURCE CONFIGURATION METHOD AND APPARATUS, DEVICE, AND STORAGE MEDIUM

(71) Applicant: GUANGDONG OPPO MOBILE TELECOMMUNICATIONS CORP., LTD., Guangdong (CN)

(72) Inventor: Haitao Li, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 494 days.

(21) Appl. No.: 17/865,402

(22) Filed: Jul. 15, 2022

(65) Prior Publication Data

US 2022/0353855 A1    Nov. 3, 2022

Related U.S. Application Data

(63) Continuation of application No. PCT/CN2020/073871, filed on Jan. 22, 2020.

(51) Int. Cl.
*H04W 72/04*  (2023.01)
*H04W 72/044* (2023.01)
*H04W 74/00*  (2009.01)
*H04W 74/0833* (2024.01)

(52) U.S. Cl.
CPC ....... *H04W 72/044* (2013.01); *H04W 74/004* (2013.01); *H04W 74/0833* (2013.01)

(58) Field of Classification Search
CPC ............. H04W 72/044; H04W 74/004; H04W 74/0833
See application file for complete search history.

(56) References Cited

U.S. PATENT DOCUMENTS

2012/0082088 A1* 4/2012 Dalsgaard ......... H04W 74/0875
                                                            370/315

FOREIGN PATENT DOCUMENTS

| CN | 108633050 | 10/2018 |
|---|---|---|
| CN | 110418402 | 11/2019 |
| WO | 2019195457 | 10/2019 |
| WO | 2019231305 | 12/2019 |

OTHER PUBLICATIONS

ZTE, "Report of Email Discussion [106#70] [NR/NTN] RACH capacity/procedures", 3GPP TSG-RAN WG2 Meeting #107 R2-1909256, Aug. 2019, pp. 1-38.

(Continued)

*Primary Examiner* — Brenda H Pham
(74) *Attorney, Agent, or Firm* — Hodgson Russ LLP

(57) ABSTRACT

Disclosed in the present application are a random access resource configuration method and apparatus, a device, and a storage medium, relating to the technical field of communication. The method comprises: a network device sends first configuration information to a terminal device, the first configuration information comprising a first random access resource pool configured for a first type of terminal device and a second random access resource pool configured for a second type of terminal device, the first random access resource pool being different to the second random access resource pool.

16 Claims, 7 Drawing Sheets

(56) References Cited

OTHER PUBLICATIONS

ETRI, "Remaining issues on random access procedures in NTN", 3GPP TSG-RAN WG2 Meeting #108 R2-1916036, Nov. 2019, pp. 1-3.
ZTE, "TP for section 6.3 on UL timing and PRACH", 3GPP TSG RAN WG1 #99 R1-1913427, Nov. 2019, pp. 1-4.
CATT et al., " PRACH design and timing advance", 3GPP TSG RAN WG1 Meeting #98 R1-1908591, Aug. 2019, pp.1-7.
ZTE, " Summary of 7.2.5.3 on UL timing and PRACH for NTN", 3GPP TSG RAN WG1 #99 R1-1913312, Nov. 2019, pp. 1-18.
"Search Report of Europe Counterpart Application No. 20915870.8", issued on Dec. 13, 2022, pp. 1-12.
ZTE Corporation, "Remaining issue on RACH for NTN", 3GPP TSG RAN WG2 Meeting #106 R2-1906114, May 2019, pp. 1-6.
"International Search Report (Form PCT/ISA/210) of PCT/CN2020/073871", mailed on Oct. 29, 2020, with English translation thereof, pp. 1-6.
"Written Opinion of the International Searching Authority (Form PCT/ISA/237) of PCT/CN2020/073871", mailed on Oct. 29, 2020, with English translation thereof, pp. 1-5.

\* cited by examiner

RANDOM ACCESS RESOURCE CONFIGURATION METHOD AND APPARATUS, DEVICE, AND STORAGE MEDIUM

CROSS-REFERENCE TO RELATED APPLICATION

This application is a continuation of international PCT application serial no. PCT/CN2020/073871, filed on Jan. 22, 2020. The entirety of the above-mentioned patent application is hereby incorporated by reference herein and made a part of this specification.

TECHNICAL FIELD

The disclosure relates to the field of communication technology, and in particular to a random access resource configuration method and apparatus, a device, and a storage medium.

DESCRIPTION OF RELATED ART

The 3rd generation partnership project (3GPP) introduced non-terrestrial network (NTN) technology in the 5G new radio (NR) system.

The NTN generally uses satellite communication to provide communication services to terrestrial users. Compared with the terrestrial cellular network communication system, the NTN system has many unique advantages. Firstly, the NTN system is not limited by the user region. Since one satellite can cover a relatively large terrain, and the satellite can orbit around the earth, theoretically every corner of the earth can be covered by the NTN system. Secondly, the NTN system has a relatively large social value. The NTN system can cover remote mountainous regions and poor and backward countries or regions at low costs, so that people in these regions can enjoy advanced voice communication and mobile Internet technology, which is conducive to narrowing the digital divide with developed regions and promoting the development of these regions. Again, the NTN system has a long distance, and communication costs do not significantly increase as the communication distance increases. Finally, the NTN system has high stability and is not limited by natural disasters.

In the NTN technology, further research is needed on how to determine the random access channel (RACH) resource required when the user equipment (UE) executes random access.

SUMMARY

The embodiments of the disclosure provide a random access resource configuration method and apparatus, a device, and a storage medium. The technical solutions are as follows.

In an aspect, an embodiment of the disclosure provides a random access resource configuration method, which is applied in a terminal device, and the method includes the following.

First configuration information sent by a network device is received. The first configuration information includes a first random access resource pool configured for a first type terminal device and a second random access resource pool configured for a second type terminal device.

The first type terminal device refers to a terminal device with a timing advance (TA) pre-compensation capability, the second type terminal device refers to a terminal device without the TA pre-compensation capability, and the first random access resource pool and the second random access resource pool are different.

In another aspect, an embodiment of the disclosure provides a random access resource configuration method, which is applied in a network device, and the method includes the following.

First configuration information is sent to a terminal device. The first configuration information includes a first random access resource pool configured for a first type terminal device and a second random access resource pool configured for a second type terminal device.

The first type terminal device refers to a terminal device with a timing advance (TA) pre-compensation capability, the second type terminal device refers to a terminal device without the TA pre-compensation capability, and the first random access resource pool and the second random access resource pool are different.

In another aspect, an embodiment of the disclosure provides a random access resource configuration apparatus, which is applied in a terminal device, and the apparatus includes the following.

An information receiving module is used to receive first configuration information sent by a network device. The first configuration information includes a first random access resource pool configured for a first type terminal device and a second random access resource pool configured for a second type terminal device.

The first type terminal device refers to a terminal device with a timing advance (TA) pre-compensation capability, the second type terminal device refers to a terminal device without the TA pre-compensation capability, and the first random access resource pool and the second random access resource pool are different.

In another aspect, an embodiment of the disclosure provides a random access resource configuration apparatus, which is applied in a network device, and the apparatus includes the following.

An information sending module is used to send first configuration information to a terminal device. The first configuration information includes a first random access resource pool configured for a first type terminal device and a second random access resource pool configured for a second type terminal device.

The first type terminal device refers to a terminal device with a timing advance (TA) pre-compensation capability, the second type terminal device refers to a terminal device without the TA pre-compensation capability, and the first random access resource pool and the second random access resource pool are different.

In another aspect, an embodiment of the disclosure provides a terminal device, and the terminal device includes a processor and a transceiver connected to the processor.

The transceiver is used to receive first configuration information sent by a network device. The first configuration information includes a first random access resource pool configured for a first type terminal device and a second random access resource pool configured for a second type terminal device.

The first type terminal device refers to a terminal device with a timing advance (TA) pre-compensation capability, the second type terminal device refers to a terminal device without the TA pre-compensation capability, and the first random access resource pool and the second random access resource pool are different.

In another aspect, an embodiment of the disclosure provides a network device, and the network device includes a processor and a transceiver connected to the processor.

The transceiver is used to send first configuration information to a terminal device. The first configuration information includes a first random access resource pool configured for a first type terminal device and a second random access resource pool configured for a second type terminal device.

The first type terminal device refers to a terminal device with a timing advance (TA) pre-compensation capability, the second type terminal device refers to a terminal device without the TA pre-compensation capability, the first random access resource pool and the second random access resource pool are different.

In another aspect, an embodiment of the disclosure provides a computer-readable storage medium, a computer program is stored in the storage medium, and the computer program is used to be executed by a processor of a terminal device to implement the random access resource configuration method on a terminal device side.

In another aspect, an embodiment of the disclosure provides a computer-readable storage medium, a computer program is stored in the storage medium, and the computer program is used to be executed by a processor of a network device to implement the random access resource configuration method on a network device side.

In another aspect, an embodiment of the disclosure provides a chip, the chip includes a programmable logic circuit and/or a program command, and when the chip is run on a terminal device, the random access resource configuration method on a terminal device side is implemented.

In another aspect, an embodiment of the disclosure provides a chip, the chip includes a programmable logic circuit and/or a program command, and when the chip is run on a network device, the random access resource configuration method on a network device side is implemented.

The technical solutions provided in the embodiments of the disclosure may include the following beneficial effects.

The first configuration information is sent to the terminal device through the network device, the first configuration information includes the first random access resource pool configured for the first type terminal device and the second random access resource pool configured for the second type terminal device, and the random access resource configuration method is provided. Furthermore, in the technical solutions provided in the embodiments of the disclosure, the first type terminal device refers to the terminal device with the TA pre-compensation capability, and the second type terminal device refers to the terminal device without the TA pre-compensation capability. Since the network device provides different resource scheduling policies according to whether the terminal device has the TA pre-compensation capability, through configuring different random access resources for terminal devices with different capabilities, after receiving a random access request of the terminal device, the network device can distinguish whether the terminal device has the TA pre-compensation capability according to different random access resources used by the random access request, thereby using the corresponding resource scheduling policy to perform resource scheduling on the terminal device in a targeted manner, which improves the accuracy and pertinence of resource scheduling performed by the network device, and also improves the utilization of random access resources.

DETAILED DESCRIPTION OF DISCLOSED EMBODIMENTS

In order for the objectives, technical solutions, and advantages of the disclosure to be clearer, the embodiments of the disclosure will be further described in detail below with reference to the drawings.

The network architectures and service scenarios described in the embodiments of the disclosure are for the purpose of illustrating the technical solutions of the embodiments of the disclosure more clearly and do not constitute a limitation on the technical solutions provided in the embodiments of the disclosure. Persons skilled in the art should know that with the evolution of network architectures and the emergence of new business scenarios, the technical solutions provided in the embodiments of the disclosure are also applicable to similar technical issues.

Figure 1:
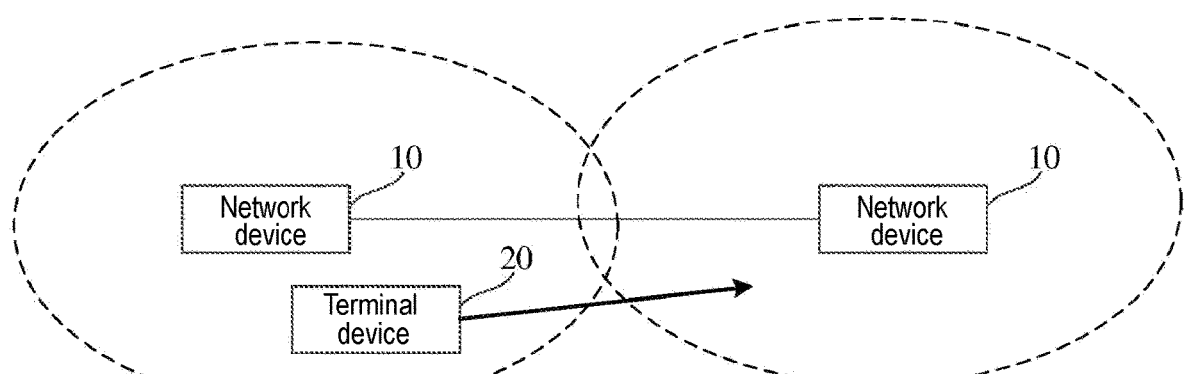
FIG. 1 is a schematic diagram of a network architecture provided in an embodiment of the disclosure.

Please refer to FIG. 1, which shows a schematic diagram of a network architecture provided in an embodiment of the disclosure. The network architecture may include a network device 10 and a terminal device 20.

The network device 10 is a device for providing a wireless communication service for the terminal device 20. A connection between the network device 10 and the terminal device 20 may be established through an air interface, so as to communicate, which includes signaling and data interaction, through the connection. The number of the network device 10 may be multiple, and communication between two adjacent network devices 10 may also be performed through a wired or wireless manner. The terminal device 20 may switch between different network devices 10, that is, establish connections with different network devices 10.

Figure 2:
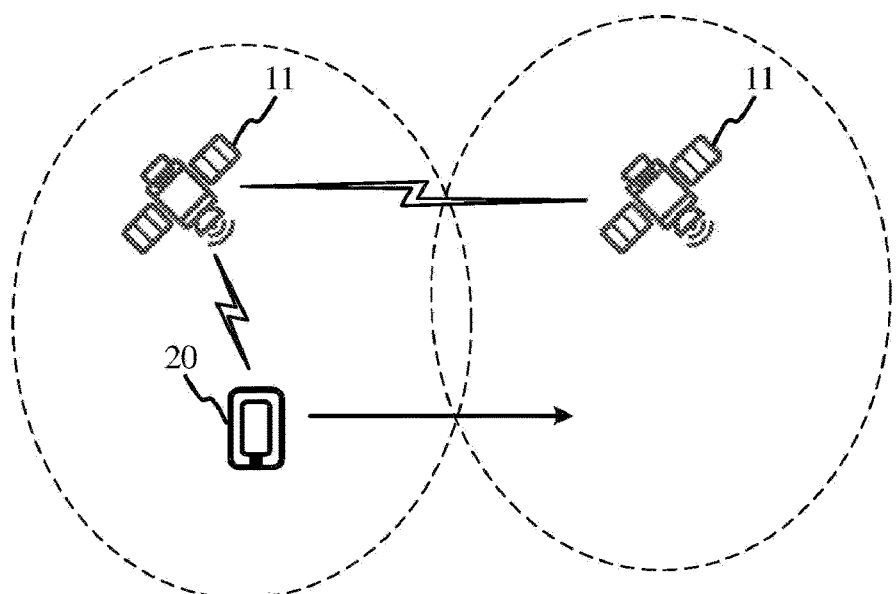
FIG. 2 is a schematic diagram of a network architecture provided in another embodiment of the disclosure.

In an example, as shown in FIG. 2, taking an NTN as an example, the network device 10 in the NTN may be a satellite 11. The satellite 11 may cover a certain range of a terrestrial region and provide the wireless communication service for the terminal device 20 in the terrestrial region. In addition, the satellite 11 may orbit around the earth, and communication coverage of different regions on the surface of the earth may be implemented through arranging multiple satellites 11.

Compared with the terrestrial cellular communication network, satellite communication has many unique advantages. Firstly, satellite communication is not limited by the user region, for example, general regions where communication devices cannot be set up such as oceans, mountains, and deserts that cannot be covered by terrestrial communication or there is no communication coverage due to sparse population. However, for satellite communication, since one satellite can cover a relatively large terrain, and the satellite can orbit around the earth, theoretically every corner of the earth can be covered by satellite communication. Secondly, satellite communication has a relatively great social value. Satellite communication can cover remote mountainous regions and poor and backward countries or regions at low costs, so that people in these regions can enjoy advanced voice communication and mobile Internet technology, which is conducive to narrowing the digital divide with developed regions and promoting the development of these regions. Again, satellite communication has a long distance, and communication costs do not significantly increase as the communication distance increases. Finally, satellite communication has high stability and is not limited by natural disasters.

Communication satellites are divided into low-earth orbit (LEO) satellites, medium-earth orbit (MEO) satellites, geostationary earth orbit (GEO) satellites, high elliptical orbit (HEO) satellites, etc. according to different orbital altitudes. The main research at this stage involves the LEO and the GEO.

1. LEO

The altitude of the low-orbit satellite ranges from 500 km to 1500 km, and the corresponding orbital period is about 1.5 hours to 2 hours. The signal propagation delay of single-hop communication between users is generally less than 20 ms. The maximum satellite viewing time is 20 minutes. The signal propagation distance is short, the link loss is small, and the transmissive power requirement of a user terminal is not high.

2. GEO

The orbital altitude of the geostationary earth orbit satellite is 35786 km, and the rotation period around the earth is 24 hours. The signal propagation delay of single-hop communication between users is generally 250 ms.

In order to ensure the coverage of the satellite and improve the system capacity of the entire satellite communication system, the satellite uses multiple beams to cover a terrain. One satellite can form tens to even hundreds of beams to cover the terrain, and one satellite beam can cover a terrestrial region of tens to hundreds of kilometers in diameter.

Figure 3:
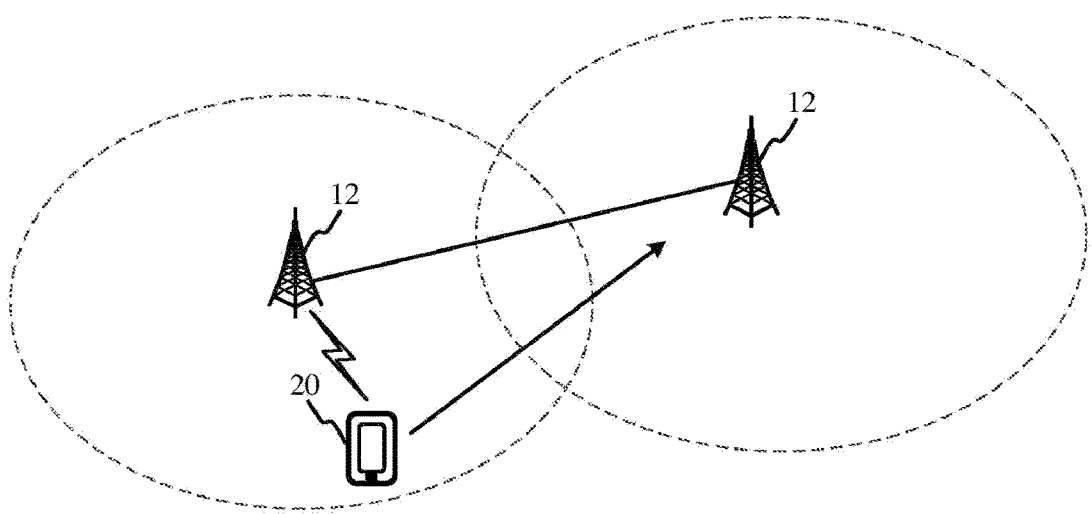
FIG. 3 is a schematic diagram of a network architecture provided in another embodiment of the disclosure.

In another example, as shown in FIG. 3, taking the cellular communication network as an example, the network device 10 in the cellular communication network may be a base station 12. The base station 12 is an apparatus deployed in an access network to provide a wireless communication function for the terminal device 20. The base stations 12 may include various forms of macro base stations, micro base stations, relay stations, access points, etc. In systems using different radio access technologies, the names of devices with network device functions may be different. For example, in a 5G new radio (NR) system, the device may be referred to as a gNodeB or gNB. With the evolution of communication technology, the name "base station" may change. For convenience of description, in the embodiments of the disclosure, the apparatuses that provide the wireless communication function for the terminal device 20 are collectively referred to as network devices.

In addition, the terminal device 20 involved in the embodiments of the disclosure may include various handheld devices, on-board devices, wearable devices, and computing devices with wireless communication functions or other processing devices connected to wireless modems, and various forms of user equipment (UE), mobile stations (MS), terminal devices, etc. For convenience of description, in the embodiments of the disclosure, the devices mentioned above are collectively referred to as terminal devices.

In addition, in the embodiments of the disclosure, the terms "network" and "system" are often interchangeably used, but persons skilled in the art can understand the meanings thereof.

Figure 4:
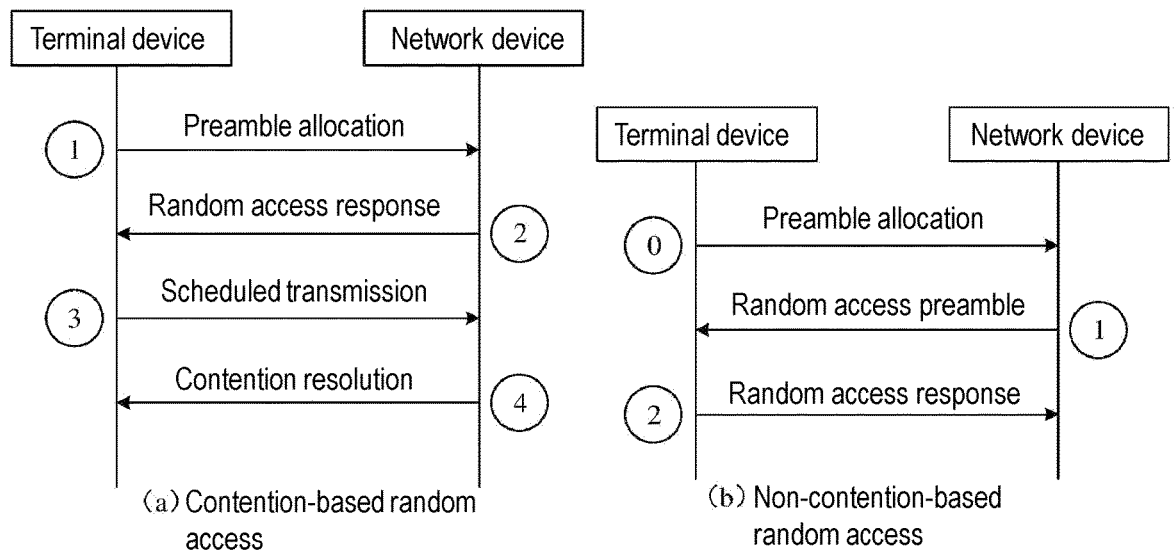
FIG. 4 is a schematic diagram of a random access process provided in an embodiment of the disclosure.

Please refer to FIG. 4. NR Release 15 (Rel-15) mainly supports two random access modes, which are respectively a contention-based random access mode and a non-contention-based random access mode.

A contention-based random access process shown in FIG. 4 is divided into 4 steps, and a non-contention-based random access process is divided into 2 steps. The detailed steps are as follows.

1. A Terminal Device Sends a Message 1 (Msg1) to a Network Device.

The terminal device selects a physical random access channel (PRACH) resource, and sends a selected preamble on the selected PRACH. In the case of non-contention-based random access, the PRACH resource and the preamble may be specified by the network device. The network device may estimate an uplink timing and a grant size required for terminal transmission of a message 3 (Msg3) based on the preamble.

2. The Network Device Sends a Random Access Response (RAR) to the Terminal Device.

After the terminal device sends the Msg1, a random access response time window is opened, and a physical downlink control channel (PDCCH) scrambled by a random access radio network temporary identifier (RA-RNTI) is monitored within the random access response time window. The RA-RNTI is calculated as follows:

$$RA\text{-}RNTI = 1 + s\_id + 14 \times t\_id + 14 \times 80 \times f\_id + 14 \times 80 \times 8 \times ul\_carrier\_id$$

that is, the RA-RNTI is related to a PRACH time-frequency resource used by the UE to send the Msg1.

After the terminal device successfully receives the PDCCH scrambled by the RA-RNTI, the terminal device can obtain a PDSCH scheduled by the PDCCH, which includes the random access response (RAR), and the RAR specifically includes the following information.

A subheader of the RAR includes BI, which is used to instruct a fallback time for retransmission of the Msg1.

In a RAPID in the RAR, the network device responds to the received preamble index.

A payload of the RAR includes a tag, which is used to adjust the uplink timing.

An uplink (UL) grant is used to schedule an uplink resource instruction of the Msg3.

A temporary cell radio network temporary identifier (C-RNTI) is used to scramble the PDCCH (initial access) of a Msg4.

If the terminal device receives the PDCCH scrambled by a random access response radio network temporary identifier (RAR-RNTI), and the RAR includes the preamble index sent by itself, the terminal device considers that the random access response has been successfully received.

For non-contention-based random access, after the terminal device successfully receives a message 2 (Msg2), the random access process ends. For contention-based random access, after the terminal device successfully receives the Msg2, the terminal device needs to continue to transmit the Msg3 and receive a message 4 (Msg4).

3. The Terminal Device Transmits the Msg3 on a Scheduling Resource of the Network Device.

The Msg3 is mainly used to inform the network device what event triggers a random access channel (RACH) process. For example, if it is an initial access random process, a UE identifier and an establishment cause are carried in the Msg3; and if it is an RRC reestablishment, a connected state UE identifier and an establishment cause are carried.

4. The Network Device Sends the Msg4 to the Terminal Device.

The Msg4 has two functions. The first is for contention resolution, and the second is for network device to transmit an RRC configuration message to the terminal device. There are two following manners of contention resolution. One is that if the UE carries a cell radio network temporary identifier (C-RNTI) in the Msg3, the Msg4 uses the PDCCH scrambled by the C-RNTI for scheduling. The other one is that if the UE does not carry the C-RNTI, such as initial access, in the Msg3, the Msg4 uses the PDCCH scrambled by a temporary cell radio network temporary identifier (TC-RNTI) for scheduling. Contention resolution is that the UE receives the physical downlink shared channel (PDSCH) of the Msg4 through matching a common control channel service data unit (CCCH SDU) in the PDSCH.

It can be seen from the above random access process that the main purpose of random access is to achieve uplink synchronization between the terminal device and the network device. During the random access process, the network device receives the preamble of the terminal device. The time when the terminal sends the preamble can be known according to the time-frequency resource of the random access channel used by the preamble, so that an initial timing advance (TA) value of the terminal is determined according to a sending time and a receiving time of the preamble, and the terminal is notified through the random access response.

Based on current Release 16 (Rel-16) NTN standardization discussion, the NTN supports two types of terminal devices. One is a terminal device without a positioning capability, and the other one is a terminal device with the positioning capability. For the two types of terminal devices, the determination methods of the initial TA are different.

Figure 5:
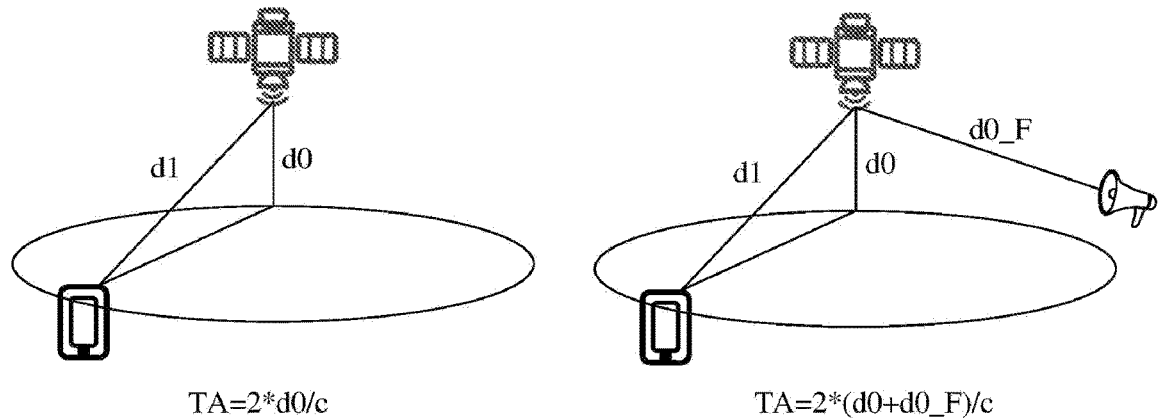
FIG. 5 is a schematic diagram of a determination method of an initial TA provided in an embodiment of the disclosure.

For the UE without the positioning capability, the network device broadcasts 1 common TA based on a signal transmission delay between a perigee and the network device. As shown in FIG. 5 below, for a regenerative payload, the common TA=2*d0/c; and for a bent-pipe payload, TA=2*(d0+d0_F)/c. Since the terminal device obtains a real TA value in the random access response, the network device considers the real TA value of the terminal device when scheduling the Msg3.

Figure 6:
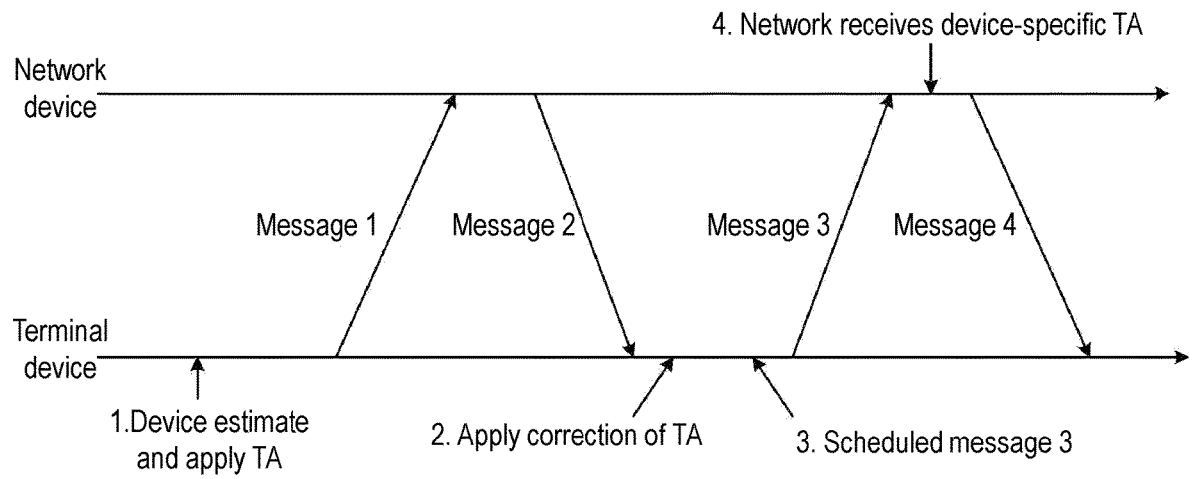
FIG. 6 is a schematic diagram of a random access process provided in another embodiment of the disclosure.

For the terminal with the positioning capability, the random access process is shown in FIG. 6 below.

In Step 1, the terminal device estimates its own TA based on the positioning capability, and sends the msg1 using the TA estimated by itself.

In Step 2, after receiving the Msg1, the network device determines a TA adjustment value of the terminal device, and instructs the terminal device through the Msg2. Since the network device does not know the exact TA value of the terminal device at this time, the network device may schedule a resource of the Msg3 of the terminal device according to the maximum uplink grant delay.

In Step 3, the terminal device adjusts the TA based on the received RAR instruction, and sends the Msg3 on the uplink resource scheduled by the network device.

In Step 4, after receiving the Msg3 of the terminal device, the network device may know the initial TA used by the terminal device. Since then, the network device and the terminal device reach an agreement on the understanding of the TA value of the terminal device.

In an exemplary embodiment, the RACH configuration is broadcast to the terminal device by the network device. The RACH configuration includes RACH time-frequency resource configuration and initial preamble root sequence configuration.

The RACH time domain resource configuration is instructed through 1 RACH configuration index. A RACH resource repetition period, the number of ROs included in one RACH resource repetition period, the duration of each RO, etc. may be obtained through the RACH configuration index.

RACH frequency domain resource configuration includes 1 RACH starting frequency domain resource index and the number of RACH resources that may be frequency-division multiplexed at the same time (that is, the number of consecutive RACH frequency domain resources). The RACH frequency domain resource may be determined as a consecutive frequency domain resource through the RACH frequency domain resource configuration.

Each cell broadcasts 1 initial preamble root sequence. An available preamble set of the cell may be obtained through cyclic shift based on the configured initial preamble root sequence.

Compared with the cellular network used in the traditional NR, the signal propagation delay between the terminal device and the network device in the NTN is greatly increased. In addition, since the network device in the NTN is implemented as the satellite, and the coverage of the satellite is very large, for different terminal devices within the coverage of the same satellite, there may be a relatively large difference in the signal transmission delay between the terminal devices and the satellite due to the different locations thereof.

For the terminal device with the TA pre-compensation capability, in terms of the random access process, the terminal device may estimate the TA by itself, and use the TA estimated by itself to send the preamble. Since the terminal device has adjusted its own uplink timing before sending the preamble, for the terminal device with the positioning capability, the network device cannot actually know the actual TA value of the terminal device when receiving the preamble. As such, when scheduling the Msg3, since the TA value of the terminal device is not clear, in order to prevent the terminal device from missing the UL grant, the network device must use the maximum TA value supported by the system to schedule a UL grant resource location of the Msg3. On the other hand, for the terminal device without the TA pre-compensation capability, since the Msg2 provides the real TA value of the terminal device, the transmission of the Msg3 may be scheduled according to the real TA. However, in the related art, the network device does not know whether the terminal device performs TA pre-compensation during the transmission of the Msg1, that is, does not know whether the terminal device has the TA pre-compensation capability, so different scheduling cannot be performed for terminal devices with different capabilities. Therefore, an embodiment of the disclosure provides a random access resource configuration method, which may be used to solve the issues in the related art.

Hereinafter, the technical solutions of the disclosure will be described with reference to several exemplary embodiments.

Figure 7:
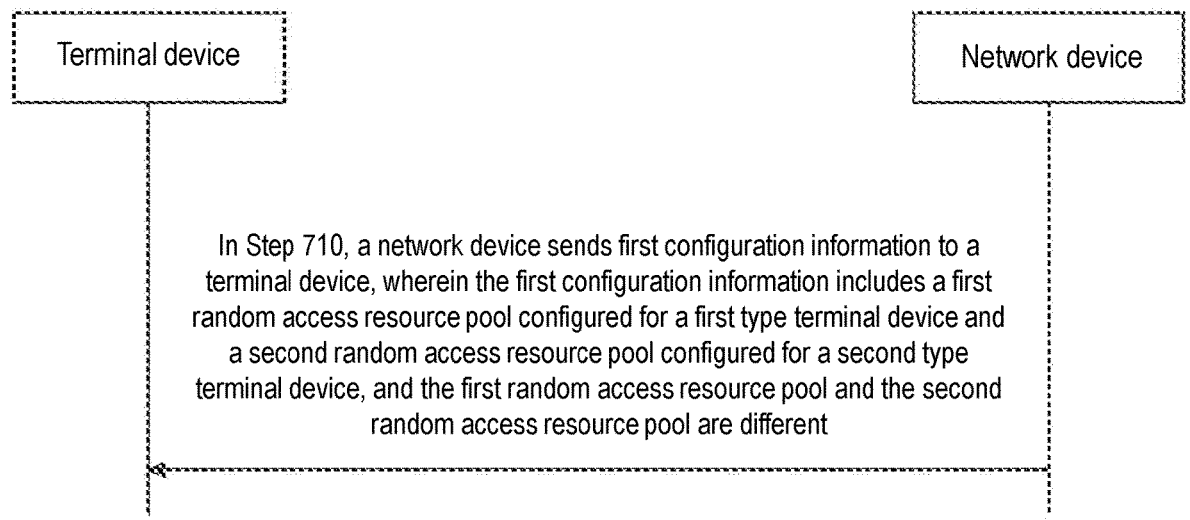
FIG. 7 is a flowchart of a random access resource configuration method provided in an embodiment of the disclosure.

Please refer to FIG. 7, which shows a flowchart of a random access resource configuration method provided in an embodiment of the disclosure. The method may be applied in the network architectures shown in FIG. 1 to FIG. 3, and the method may include the following steps.

In Step 710, a network device sends first configuration information to a terminal device.

The first configuration information includes a first random access resource pool configured for a first type terminal device and a second random access resource pool configured for a second type terminal device.

The random access resource pool includes an available random access resource. In the embodiment of the disclosure, before the network device establishes a communication connection with the terminal device, the network device needs to allocate the available random access resource to the terminal device to ensure that the terminal device may send a random access request to the network device using the random access resource. Optionally, the random access resource may be a preamble, a time-frequency resource, etc. The terminal device sends the random access request to the network device on a random access channel allocated by the network device.

Since different terminal devices are orthogonal multiple access in time and frequency, that is, uplink transmissions of different terminal devices in the same serving cell under the network device do not interfere with each other, in order to ensure the orthogonality of the uplink transmissions to prevent intra-cell interference, the network device requires the time when signals from terminal devices in the same subframe but in different frequency domain reach the network device to be basically aligned. In terms of a terminal device side, timing advance (TA) is essentially a negative offset between the starting time of receiving a downlink subframe and the time of transmitting time of an uplink subframe. The time when the uplink signals from different terminal devices reach the network device may be controlled through appropriately controlling the offset of each terminal device. For a terminal device farther from the network device, due to a larger transmission delay, uplink data must be sent earlier than a terminal device nearer to the network device. Optionally, the TA pre-compensation capability means that the terminal device may perform TA pre-compensation on the random access request, that is, the terminal device may send the random access request in advance according to a certain TA value, thereby adjusting the time when the random access request reaches the network device.

In the embodiment of the disclosure, the first type terminal device refers to the terminal device with the TA pre-compensation capability, and the second type terminal device refers to the terminal device without the TA pre-compensation capability.

In the embodiment of the disclosure, for the terminal device with the TA pre-compensation capability and the terminal device without the TA pre-compensation capability, the network device has different resource scheduling policies when scheduling uplink resources. Therefore, when the network device receives the random access request of the terminal device, it is necessary to distinguish whether the terminal device has the TA pre-compensation capability. Therefore, in the embodiment of the disclosure, when configuring the random access resource for the terminal device, the network device configures two different types of random access resource pools, that is, the first random access resource pool and the second random access resource pool, and the first random access resource pool is different from the second random access resource pool, that is, a random access resource in the first random access resource pool is different from a random access resource in the second random access resource pool. In the embodiment of the disclosure, the first type terminal device with the TA pre-compensation capability may use the random access resource in the first random access resource pool to send the random access request, and the second type terminal device without the TA pre-compensation capability may use the random access resource in the second random access resource pool to send the random access request. After receiving the random access request of the terminal device, the network device may distinguish whether the terminal device has the TA pre-compensation capability according to the different random access resources used by the random access request, thereby using the corresponding resource scheduling policy to perform resource scheduling on the terminal device.

Optionally, the first configuration information refers to cell common configuration information, that is, the network device may broadcast the first configuration information to all terminal devices in the cell through broadcasting. Optionally, the first configuration information may be carried in system information, for example, carried in a system information block x (SIBx), where x is a positive integer greater than or equal to 1. In this way, in the embodiment of the disclosure, the network device may send the first configuration information to multiple terminal devices served by the network device at one time, so as to prevent the network device from sending the first configuration information multiple times, which reduces the processing overhead of the network device. In addition, in the embodiment of the disclosure, the first configuration information may be carried in the system information, so as to prevent the network device from using separate signaling to encapsulate the first configuration information, which reduces unnecessary signaling overhead between the network device and the terminal device. In addition, the embodiment of the disclosure does not limit the generation manner of the first configuration information. Optionally, the first configuration information may be information pre-configured in a network or may be information pre-specified in a protocol.

In summary, in the technical solution provided in the embodiment of the disclosure, the first configuration information is sent to the terminal device through the network device, the first configuration information includes the first random access resource pool configured for the first type terminal device and the second random access resource pool configured for the second type terminal device, and the random access resource configuration method is provided. Furthermore, in the technical solution provided in the embodiment of the disclosure, the first type terminal device refers to the terminal device with the TA pre-compensation capability, and the second type terminal device refers to the terminal device without the TA pre-compensation capability. Since the network device provides different resource scheduling policies according to whether the terminal device has the TA pre-compensation capability, through configuring different random access resources for terminal devices with different capabilities, after receiving the random access request of the terminal device, the network device can distinguish whether the terminal device has the TA pre-compensation capability according to different random access resources used by the random access request, thereby using the corresponding resource scheduling policy to perform resource scheduling on the terminal device in a targeted manner, which improves the accuracy and pertinence of resource scheduling performed by the network device, and also improves the utilization of random access resources.

In addition, in the technical solution provided in the embodiment of the disclosure, the first configuration information refers to the cell common configuration information, which can prevent the network device from issuing the configuration information to the terminal device multiple times, thereby reducing the processing overhead of the network device. In addition, the first configuration information may be carried in the system information, which prevents the network device from using separate signaling to encapsulate the first configuration information, thereby reducing unnecessary signaling overhead between the network device and the terminal device. In addition, the first configuration information may be information pre-configured in the network or may be information pre-specified in the protocol, which improves the flexibility of generating the first configuration information.

In a possible implementation, the first random access resource pool includes a first time-frequency resource, the second random access resource pool includes a second time-frequency resource, and the first time-frequency resource and the second time-frequency resource do not have any overlapping region. Since the terminal device needs to occupy a certain time-frequency resource when sending the random access request to the network device, in the embodiment of the disclosure, different time-frequency resources may be configured for the first type terminal device and the second type terminal device, that is, the first time-frequency resource and the second time-frequency resource without any overlapping region are configured, wherein the first type terminal device may use the first time-frequency resource to send the random access request, the second type terminal device may use the second time-frequency resource to send the random access request, and after receiving the random access request, the network device may distinguish the type of the terminal device according to the different time-frequency resources. Optionally, the time-frequency resource includes a time domain resource and a frequency domain resource, and different time-frequency resources may be further distinguished according to the different time domain resources and/or the different frequency domain resources. The embodiment of the disclosure does not limit the specific representation form of the time-frequency resource. Optionally, the time-frequency resource may be represented in the form of a distribution map or may be represented in the form of a table. In the following exemplary embodiments, only the representation in the form of the distribution map is taken as an example for illustration.

Figure 8:
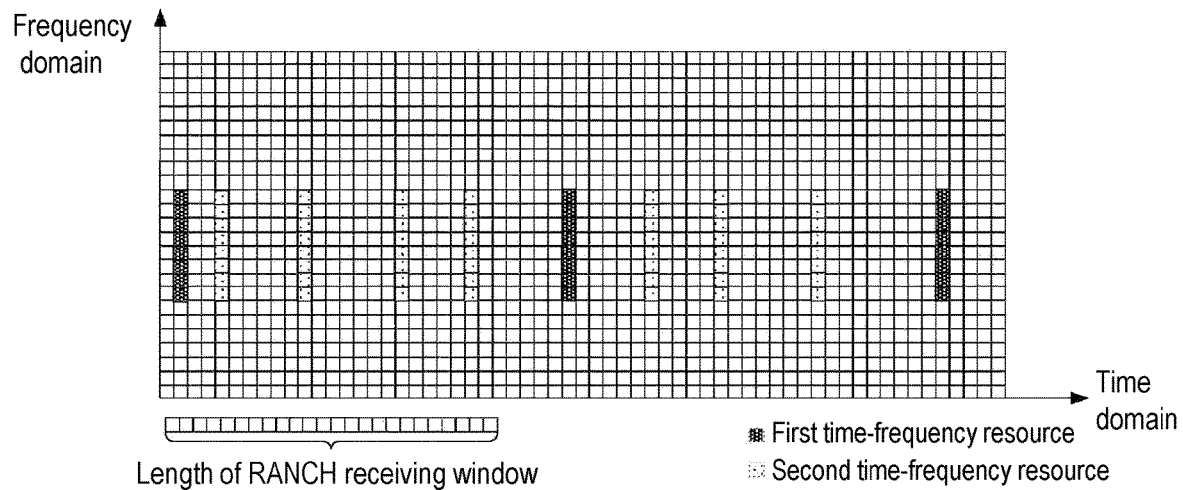
FIG. 8 is a distribution diagram of time-frequency resources provided in an embodiment of the disclosure.

In an example, the first time-frequency resource includes a first time domain resource, and the second time-frequency resource includes a second time domain resource. The first time domain resource and the second time domain resource do not have any overlapping region in the time domain, that is, a time domain unit occupied by the first time domain resource in the time domain is different from a time domain unit occupied by the second time domain resource in the time domain. Optionally, the time domain unit may be a subframe, a time slot, etc., which is not limited in the embodiment of the disclosure. Optionally, the frequency domain resource included in the first time-frequency resource may be different from the frequency domain resource included in the second time-frequency resource or may be the same as the frequency domain resource included in the second time-frequency resource, which is not limited in the embodiment of the disclosure. The frequency domain resource included in the first time-frequency resource being different from the frequency domain resource included in the second time-frequency resource includes that the frequency domain resource included in the first time-frequency resource and the frequency domain resource included in the second time-frequency resource partially do not overlap or do not overlap at all, which is not limited in the embodiment of the disclosure. For example, as shown in FIG. 8, which shows a time-frequency resource distribution diagram, the abscissa of the time-frequency resource distribution diagram represents the time domain, and the ordinate represents the frequency domain. FIG. 8 shows the cases where the frequency domain resource in the first time-frequency resource is the same as the frequency domain resource in the second time-frequency resource, and the time domain resource in the first time-frequency resource is different from the time domain resource in the second time-frequency resource. Specifically, the time domain resource in the first time-frequency resource and the time domain resource in the second time-frequency resource do not have any overlapping region, that is, the first time domain resource and the second time domain resource do not overlap.

Figure 9:
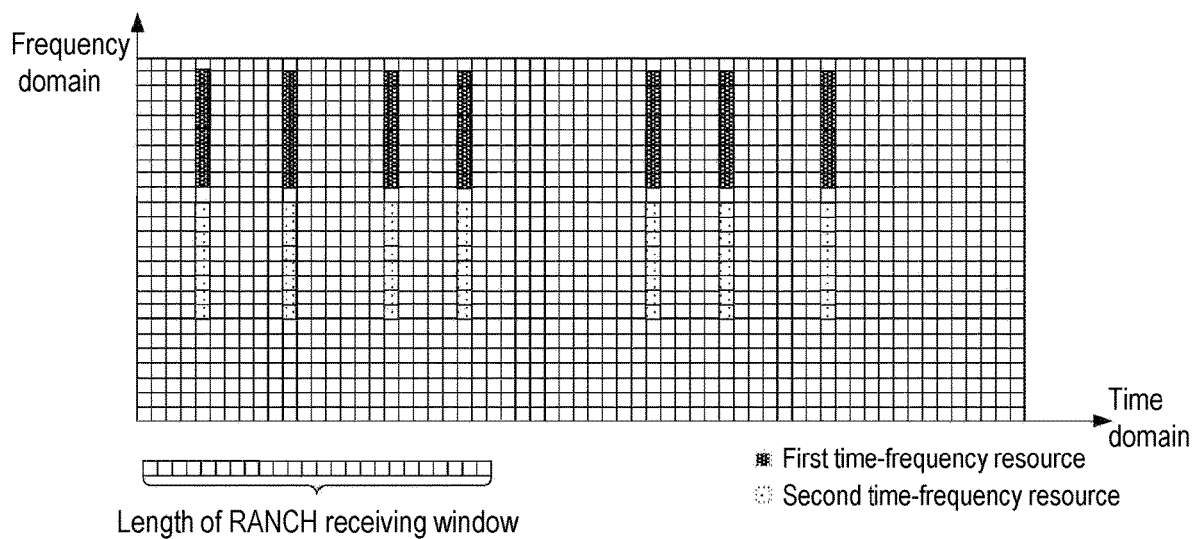
FIG. 9 is a distribution diagram of time-frequency resources provided in another embodiment of the disclosure.

In another example, the first time-frequency resource includes a first frequency domain resource, and the second time-frequency resource includes a second frequency domain resource. The first frequency domain resource and the second frequency domain resource do not have any overlapping region in the frequency domain, that is, a frequency domain unit occupied by the first frequency domain resource in the frequency domain is different from a frequency domain unit occupied by the second frequency domain resource in the frequency domain. Optionally, the frequency domain unit may be a carrier, a subcarrier, etc., which is not limited in the embodiment of the disclosure. Optionally, the time domain resource included in the first time-frequency resource may be different from the time domain resource included in the second time-frequency resource or may be the same as the time domain resource included in the second time-frequency resource, which is not limited in the embodiment of the disclosure. The time domain resource included in the first time-frequency resource being different from the time domain resource included in the second time-frequency resource includes that the time domain resource included in the first time-frequency resource and the time domain resource included in the second time-frequency resource partially do not overlap or do not overlap at all, which is not limited in the embodiment of the disclosure. For example, as shown in FIG. 9, which shows a time-frequency resource distribution diagram, the abscissa of the time-frequency resource distribution diagram represents the time domain, and the ordinate represents the frequency domain. FIG. 9 shows the cases where the time domain resource in the first time-frequency resource is the same as the time domain resource in the second time-frequency resource, and the frequency domain resource in the first time-frequency resource is different from the frequency domain resource in the second time-frequency resource. Specifically, the frequency domain resource in the first time-frequency resource and the frequency domain resource in the second time-frequency resource do not have any overlapping region, that is, the first frequency domain resource and the second frequency domain resource do not overlap.

Figure 10:
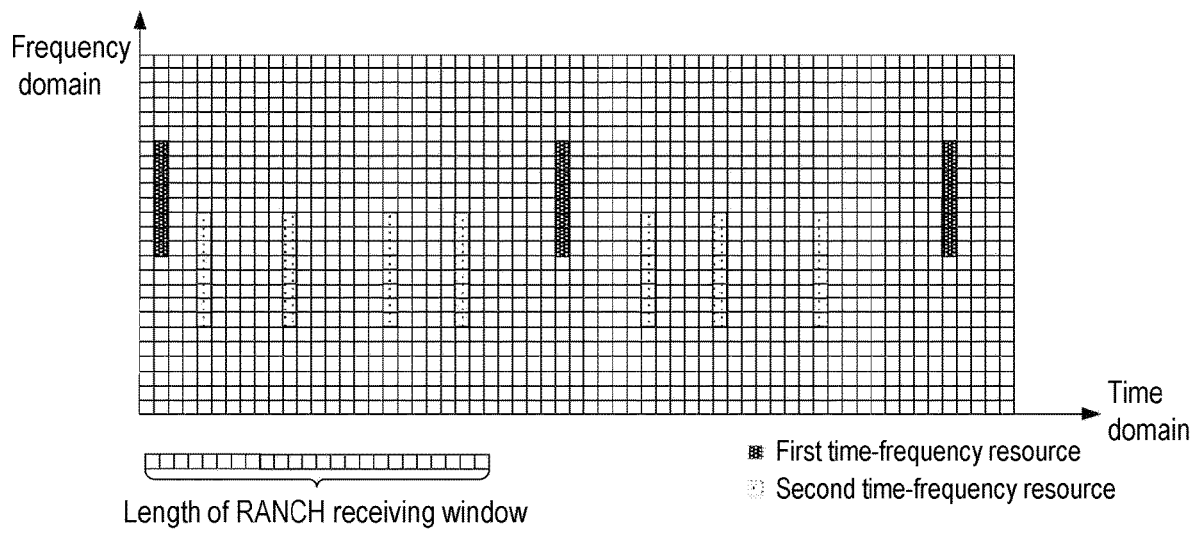
FIG. 10 is a distribution diagram of time-frequency resources provided in yet another embodiment of the disclosure.

In yet another example, the first time-frequency resource includes a first time domain resource and a first frequency domain resource, and the second time-frequency resource includes a second time domain resource and a second frequency domain resource. The first time domain resource and the second time domain resource do not have any overlapping region in the time domain and/or the first frequency domain resource and the second frequency domain resource do not have any overlapping region in the frequency domain, that is, subframes occupied by the first time-frequency resource and the second time-frequency resource in the time domain are different and/or bandwidths occupied in the frequency domain are different. For example, as shown in FIG. 10, which shows a time-frequency resource distribution diagram, the abscissa of the time-frequency resource distribution diagram represents the time domain, and the ordinate represents the frequency domain. FIG. 10 shows the cases where the time domain resource in the first time-frequency resource and the time domain resource in the second time-frequency resource do not have any overlapping region in the time domain, and the frequency domain resource in the first time-frequency resource and the frequency domain resource in the second time-frequency resource have an overlapping region in the frequency domain.

Optionally, in order for the network device to have enough time to process the random access request of the terminal device, the time interval between any adjacent random access channel occasions (ROs) in the second time domain resource is greater than or equal to the length of the random access channel (RACH) receiving window of the network device. Optionally, the time domain distribution density of ROs in the first time domain resource is greater than the time domain distribution density of ROs in the second time domain resource.

In summary, in the technical solution provided in the embodiment of the disclosure, the first time-frequency resource is configured for the first type terminal device and the second time-frequency resource is configured for the second type terminal device through the network device, and the first time-frequency resource and the second time-frequency resource do not have any overlapping region, thereby providing a specific random access resource configuration method. In addition, the embodiment of the disclosure provides various time-frequency resource configuration solutions, which improves the flexibility of the network device for time-frequency resource configuration.

In another possible implementation, a first random access resource pool includes a first preamble set, and a second random access resource pool includes a second preamble set. The first preamble set and the second preamble set do not have the same preamble. In the embodiment of the disclosure, a terminal device sending a random access request to a network device includes the terminal device sending a random access preamble to the network device, the network device considering that the random access request of the terminal device is received when receiving the preamble of the terminal device, and then sending a random access response (RAR) to the terminal device to inform the terminal device that the random access request is successfully received. In the embodiment of the disclosure, different preambles, that is, the first preamble set and the second preamble set without the same preamble, may be configured for a first type terminal device and a second type terminal device. The first type terminal device may send the random access request according to the preamble in the first preamble set, and the second type terminal device may send the random access request according to the preamble in the second preamble set. After receiving the random access request, the network device may distinguish the type of the terminal device according to the different preambles. The embodiment of the disclosure does not limit the representation form of the preamble set. Optionally, the preamble set may be represented in the form of a preamble index list.

In summary, in the technical solution provided in the embodiment of the disclosure, the first preamble set is configured for the first type terminal device and the second preamble set is configured for the second type terminal device through the network device, and the first preamble set and the second preamble set do not have the same preamble, thereby providing a specific random access resource configuration method. In addition, in the technical solution provided in the embodiment of the disclosure, the first type terminal device and the second type terminal device are distinguished using the preambles, which prevents the issue of low resource utilization that may be caused by dividing the time frequency resources into blocks when using the time frequency resources to distinguish whether the terminal equipment has the TA pre-compensation capability, and improves the utilization efficiency of the time-frequency resources.

Figure 11:
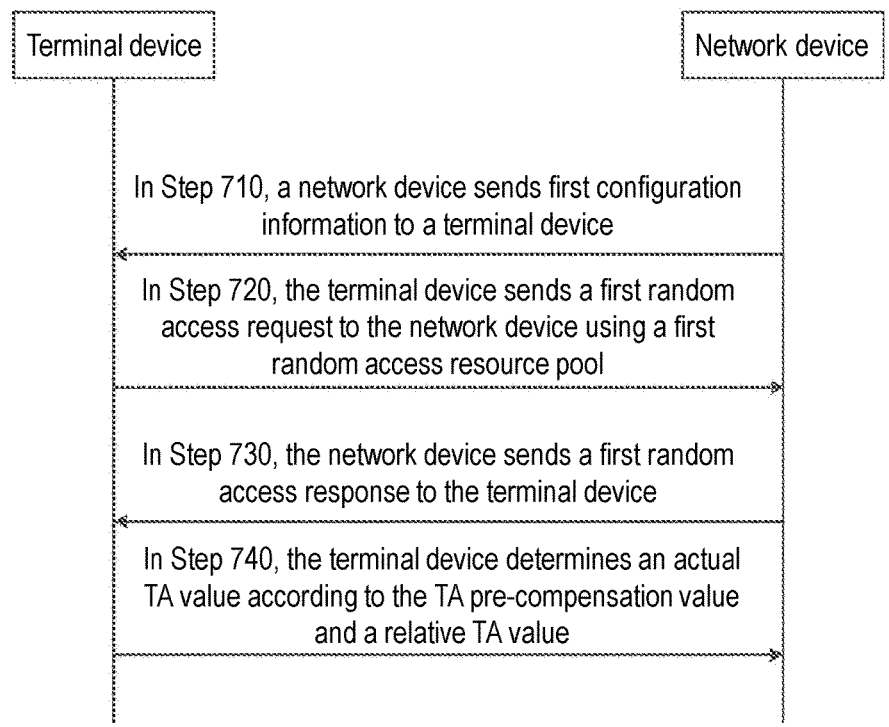
FIG. 11 is a flowchart of a random access resource configuration method provided in another embodiment of the disclosure.

In still another possible implementation, as shown in FIG. 11, the random access resource configuration method may further include the following steps.

In Step 720, the terminal device sends a first random access request to the network device using a first random access resource pool.

In the embodiment of the disclosure, in the case where the terminal device belongs to the first type terminal device, the terminal device uses a random access resource in the first random access resource pool to send the first random access request to the network device, so that after receiving the random access request of the terminal device, the network device parses out that the random access resource used by the random access request belongs to the first random access resource pool to determine that the terminal device is the first type terminal device, that is, the terminal device has a TA pre-compensation capability.

In an example, the random access resource configuration method may further include the following. The terminal device determines a TA pre-compensation value. The TA pre-compensation value is used to perform TA pre-compensation when sending the first random access request. In the example, in the case where the terminal device belongs to the first type terminal device, that is, the terminal device has the TA pre-compensation capability, the terminal device may determine the TA pre-compensation value, and use the TA pre-compensation value for TA pre-compensation when sending the first random access request.

Optionally, in the case where the terminal device has the positioning capability, the TA pre-compensation value is an estimated TA value determined by the terminal device according to the positioning capability. In the example, in the case where the terminal device has the positioning capability, the terminal device may estimate the distance between itself and the network device according to its own positioning capability, further calculate the estimated TA value, determine the estimated TA value as the TA pre-compensation value, and use the TA pre-compensation value for TA pre-compensation when sending the first random access request.

Optionally, in the case where the terminal device does not have the positioning capability, the TA pre-compensation value is a common TA value. In the example, the network device may broadcast system information to the terminal device under the service thereof, and the common TA value can be carried in the system information. In the case where the terminal device does not have the positioning capability, the terminal device may determine the common TA value as the TA pre-compensation value to use the TA pre-compensation value for TA pre-compensation when sending the first random access request. It should be noted that in the case where the terminal device has the positioning capability, the terminal device may also determine the common TA value as the TA pre-compensation value, that is, the terminal device does not execute the process of determining the estimated TA value according to the positioning capability, which is not limited in the embodiment of the disclosure.

In Step 730, the network device sends a first random access response to the terminal device.

After receiving the random access request from the terminal device, the network device may determine whether the terminal device has the TA pre-compensation capability, that is, whether the terminal device belongs to the first type terminal device, according to the random access resource used by the random access request. In the case where the terminal device is determined to belong to the first type terminal device, the first random access response is sent to the terminal device. The first random access response includes a relative TA value configured for the first type terminal device.

In Step 740, the terminal device determines an actual TA value according to the TA pre-compensation value and the relative TA value.

In the embodiment of the disclosure, the relative TA value carried by the network device in the first random access response is determined by the offset between the terminal device and the network device after performing TA pre-compensation on the terminal device with the TA pre-compensation capability. Therefore, when determining the actual TA value, the terminal device with the TA pre-compensation capability needs to consider the TA pre-compensation value determined during TA pre-compensation. Optionally, the terminal device may determine the sum of the TA pre-compensation value and the relative TA value as the actual TA value, and use the actual TA value to subsequently transmit uplink information to the network device.

In summary, in the technical solution provided in the embodiment of the disclosure, the terminal device uses the first random access resource pool to send the first random access request to the network device. After receiving the random access request, in the case where the terminal device is determined to have the TA pre-compensation capability, the network device sends the first random access response to the terminal device, and the random access response carries the relative TA value. The terminal device determines the actual TA value according to the relative TA value and the TA pre-compensation value used for TA pre-compensation, thereby determining a determination method of the actual TA value. In addition, in the technical solution provided in the embodiment of the disclosure, two methods for determining the TA pre-compensation value are provided for whether the terminal device with the TA pre-compensation capability has the positioning capability. When the terminal device has the positioning capability, the TA pre-compensation value may be the estimated TA value estimated by the terminal device according to the positioning capability. When the terminal device does not have the positioning capability, the TA pre-compensation value may be the common TA value received by the terminal device. Through setting the TA pre-compensation method for the terminal devices with different capabilities, the flexibility of the terminal device for TA pre-compensation is improved.

Figure 12:
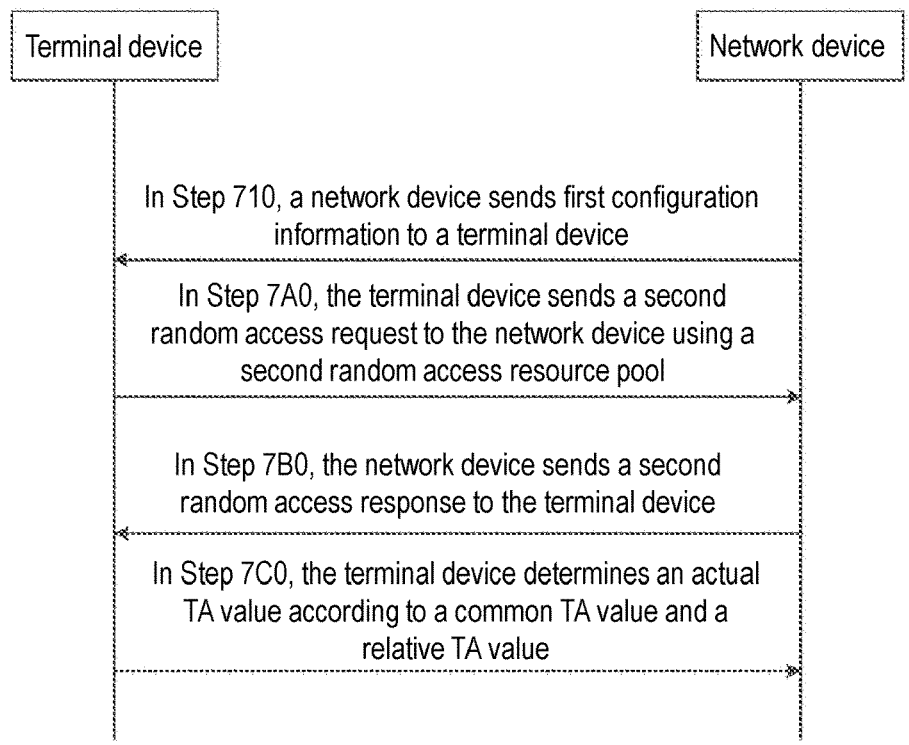
FIG. 12 is a flowchart of a random access resource configuration method provided in yet another embodiment of the disclosure.

In another possible implementation, as shown in FIG. 12, the random access resource configuration method may further include the following steps.

In Step 7A0, the terminal device sends a second random access request to the network device using a second random access resource pool.

In the embodiment of the disclosure, in the case where the terminal device belongs to the second type terminal device, the terminal device uses a random access resource in the second random access resource pool to send the second random access request to the network device, so that after receiving the random access request of the terminal device, the network device parses out that the random access resource used by the random access request belongs to the second random access resource pool to determine that the terminal device is the second type terminal device, that is, the terminal device does not have a TA pre-compensation capability.

In Step 7B0, the network device sends a second random access response to the terminal device.

In the case where the network device determines that the terminal device belongs to the second type terminal device, the second random access response may be sent to the terminal device. The second random access response includes a relative TA value configured for the second type terminal device.

In Step 7C0, the terminal device determines an actual TA value according to a common TA value and the relative TA value.

In the embodiment of the disclosure, the network device may broadcast system information to the terminal device under the service thereof, the system information carries the common TA value, and the second type terminal device without the TA pre-compensation capability may also receive the common TA value. Therefore, when the network device sends the random access response to the second terminal device to instruct the actual TA value, the common TA value may be removed, and the relative TA value may be sent to the terminal device, thereby reducing the value range of the TA value in the random access response to a certain extent, which is conducive to reducing signaling overhead. After receiving the relative TA value in the random access response, the terminal device may determine the actual TA value according to the common TA value and the relative TA value. Optionally, the terminal device may determine the sum of the common TA value and the relative TA value as the actual TA value, and use the actual TA value to subsequently transmit uplink information to the network device.

In summary, in the technical solution provided in the embodiment of the disclosure, the terminal device uses the second random access resource pool to send the second random access request to the network device. After receiving the random access request, in the case where the terminal device is determined to not have the TA pre-compensation capability, the network device sends the second random access response to the terminal device, and the random access response carries the relative TA value. The terminal device determines the actual TA value according to the relative TA value and the common TA value, thereby determining a determination method of the actual TA value. Moreover, compared with the related art in which the actual TA value is directly carried in the random access response, the embodiment of the disclosure splits the actual TA value into two parts to be sent to the terminal device without the TA pre-compensation capability. One part is the common TA value carried in the system information, and the other part is the relative TA value carried in the random access response. After receiving the random access response, the terminal device may determine the actual TA value according to the common TA value and the relative TA value, thereby reducing the value range of the TA value in the random access response, which is conducive to reducing signaling overhead.

It should be noted that in the above method embodiments, the technical solutions of the disclosure are introduced and explained mainly in terms of the interaction between the network device and the terminal device. The above steps executed by the terminal device may be independently implemented as the random access resource configuration method on a terminal device side, and the above steps executed by the network device may be independently implemented as the random access resource configuration method on a network device side.

The following is the apparatus embodiment of the disclosure, which may be used to execute the method embodiment of the disclosure. For details not disclosed in the apparatus embodiment of the disclosure, please refer to the method embodiment of the disclosure.

Figure 13:
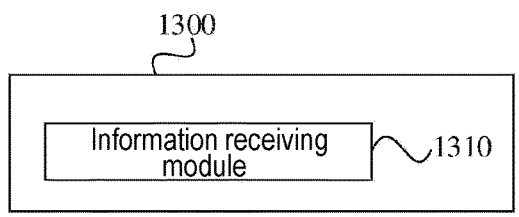
FIG. 13 is a block diagram of a random access resource configuration apparatus provided in an embodiment of the disclosure.

Please refer to FIG. 13, which shows a block diagram of a random access resource configuration apparatus provided in an embodiment of the disclosure. The apparatus has the function of implementing the above method example of a terminal device side, and the function may be implemented through hardware, through executing corresponding software by hardware to implement the terminal device, or may be set in the terminal device. As shown in FIG. 13, an apparatus 1300 may include an information receiving module 1310.

The information receiving module 1310 is used to receive first configuration information sent by the network device. The first configuration information includes a first random access resource pool configured for a first type terminal device and a second random access resource pool configured for a second type terminal device.

The first type terminal device refers to a terminal device with a timing advance (TA) pre-compensation capability, the second type terminal device refers to a terminal device without the TA pre-compensation capability, and the first random access resource pool and the second random access resource pool are different.

In an exemplary embodiment, the first random access resource pool includes a first time-frequency resource, the second random access resource pool includes a second time-frequency resource, and the first time-frequency resource and the second time-frequency resource do not have any overlapping region.

In an exemplary embodiment, the first time-frequency resource includes a first time domain resource, the second time-frequency resource includes a second time domain resource, and the first time domain resource and the second time domain resource do not have any overlapping region in the time domain.

In an exemplary embodiment, the first time-frequency resource includes a first frequency domain resource, the second time-frequency resource includes a second frequency domain resource, and the first frequency domain resource and the second frequency domain resource do not have any overlapping region in the frequency domain.

In an exemplary embodiment, the first time-frequency resource includes a first time domain resource and a first frequency domain resource, the second time-frequency resource includes a second time domain resource and a second frequency domain resource, and the first time domain resource and the second time domain resource do not have any overlapping region in the time domain and/or the first frequency domain resource and the second frequency domain resource do not have any overlapping region in the frequency domain.

In an exemplary embodiment, a time interval between any adjacent random access channel occasions (ROs) in the second time domain resource is greater than or equal to a length of a random access channel (RACH) receiving window of the network device.

In an exemplary embodiment, a time domain distribution density of ROs in the first time domain resource is greater than a time domain distribution density of ROs in the second time domain resource.

In an exemplary embodiment, the first random access resource pool includes a first preamble set, the second random access resource pool includes a second preamble set, and the first preamble set and the second preamble set do not have the same preamble.

In an exemplary embodiment, the first configuration information refers to cell common configuration information, and the first configuration information is carried in system information.

Figure 14:
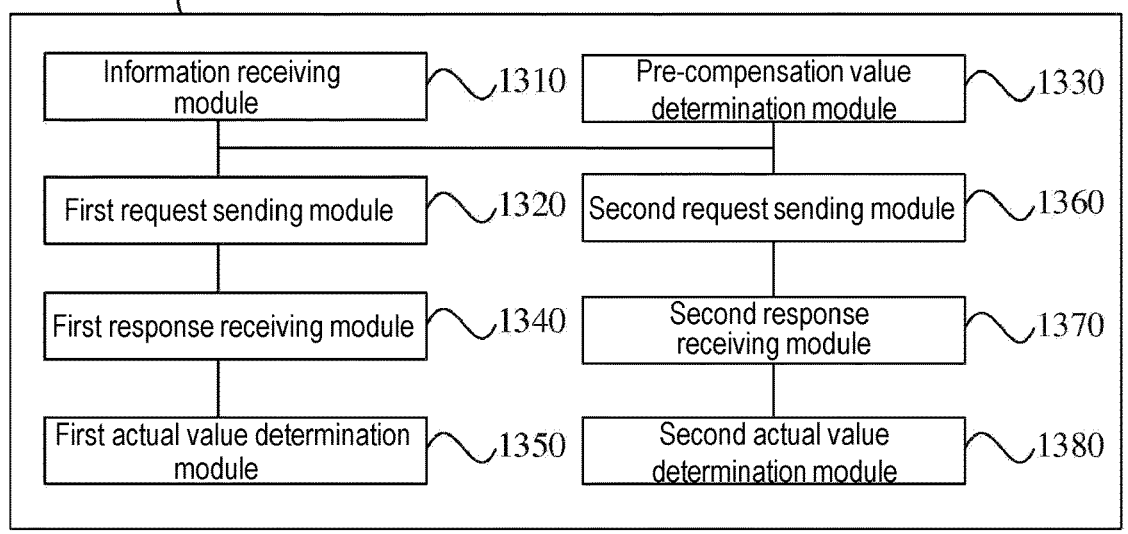
FIG. 14 is a block diagram of a random access resource configuration apparatus provided in another embodiment of the disclosure.

In an exemplary embodiment, as shown in FIG. 14, the terminal device belongs to the first type terminal device. The apparatus 1300 further includes a first request sending module 1320, which is used to send a first random access request to the network device using the first random access resource pool.

In an exemplary embodiment, as shown in FIG. 14, the apparatus further includes a pre-compensation value determination module 1330, which is used to determine a TA pre-compensation value. The TA pre-compensation value is used to perform TA pre-compensation when sending the first random access request.

In an exemplary embodiment, in the case where the terminal device has a positioning capability, the TA pre-compensation value is an estimated TA value determined by the terminal device according to the positioning capability.

In an exemplary embodiment, in the case where the terminal device does not have the positioning capability, the TA pre-compensation value is a common TA value.

In an exemplary embodiment, as shown in FIG. 14, the apparatus 1300 further includes the following. A first response receiving module 1340 is used to receive a first random access response sent by the network device. The first random access response includes a relative TA value configured for the first type terminal device. A first actual value determination module 1350 is used to determine an actual TA value according to the TA pre-compensation value and the relative TA value.

In an exemplary embodiment, as shown in FIG. 14, the terminal device belongs to the second type terminal device. The apparatus 1300 further includes a second request sending module 1360, which is used to send a second random access request to the network device using the second random access resource pool.

In an exemplary embodiment, as shown in FIG. 14, the apparatus 1300 further includes the following. A second response receiving module 1370 is used to receive the second random access response sent by the network device. The second random access response includes a relative TA value configured for the second type terminal device. A second actual value determination module 1380 is used to determine an actual TA value according to the common TA value and the relative TA value.

In summary, in the technical solution provided in the embodiment of the disclosure, the first configuration information is sent to the terminal device through the network device, the first configuration information includes the first random access resource pool configured for the first type terminal device and the second random access resource pool configured for the second type terminal device, and the random access resource configuration method is provided. Furthermore, in the technical solution provided in the embodiment of the disclosure, the first type terminal device refers to the terminal device with the TA pre-compensation capability, and the second type terminal device refers to the terminal device without the TA pre-compensation capability. Since the network device provides different resource scheduling policies according to whether the terminal device has the TA pre-compensation capability, through configuring different random access resources for terminal devices with different capabilities, after receiving the random access request of the terminal device, the network device can distinguish whether the terminal device has the TA pre-compensation capability according to different random access resources used by the random access request, thereby using the corresponding resource scheduling policy to perform resource scheduling on the terminal device in a targeted manner, which improves the accuracy and pertinence of resource scheduling performed by the network device, and also improves the utilization of random access resources.

Figure 15:
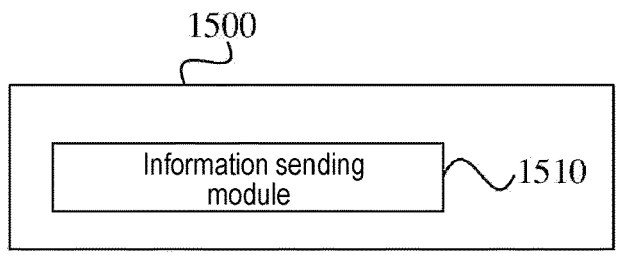
FIG. 15 is a block diagram of a random access resource configuration apparatus provided in still another embodiment of the disclosure.

Please refer to FIG. 15, which shows a block diagram of a random access resource configuration apparatus provided in an embodiment of the disclosure. The apparatus has the function of implementing the above method example of a network device side. The function may be implemented through hardware, through executing corresponding software by hardware to implement the terminal device, or may be set in the network device. As shown in FIG. 15, an apparatus 1500 may include an information sending module 1510.

The information sending module 1510 is used to send first configuration information to the terminal device. The first configuration information includes a first random access resource pool configured for a first type terminal device and a second random access resource pool configured for a second type terminal device.

The first type terminal device refers to a terminal device with a timing advance (TA) pre-compensation capability, the second type terminal device refers to a terminal device without the TA pre-compensation capability, the first random access resource pool and the second random access resource pool are different.

In an exemplary embodiment, the first random access resource pool includes a first time-frequency resource, the second random access resource pool includes a second time-frequency resource, and the first time-frequency resource and the second time-frequency resource do not have any overlapping region.

In an exemplary embodiment, the first time-frequency resource includes a first time domain resource, the second time-frequency resource includes a second time domain resource, and the first time domain resource and the second time domain resource do not have any overlapping region in the time domain.

In an exemplary embodiment, the first time-frequency resource includes a first frequency domain resource, the second time-frequency resource includes a second frequency domain resource, and the first frequency domain resource and the second frequency domain resource do not have any overlapping region in the frequency domain.

In an exemplary embodiment, the first time-frequency resource includes a first time domain resource and a first frequency domain resource, the second time-frequency resource includes a second time domain resource and a second frequency domain resource, and the first time domain resource and the second time domain resource do not have any overlapping region in the time domain and/or the first frequency domain resource and the second frequency domain resource do not have any overlapping region in the frequency domain.

In an exemplary embodiment, a time interval between any adjacent random access channel occasions (ROs) in the second time domain resource is greater than or equal to the length of a random access channel (RACH) receiving window of the network device.

In an exemplary embodiment, a time domain distribution density of ROs in the first time domain resource is greater than a time domain distribution density of ROs in the second time domain resource.

In an exemplary embodiment, the first random access resource pool includes a first preamble set, the second random access resource pool includes a second preamble set, and the first preamble set and the second preamble set do not have the same preamble.

In an exemplary embodiment, the first configuration information refers to cell common configuration information, and the first configuration information is carried in system information.

Figure 16:
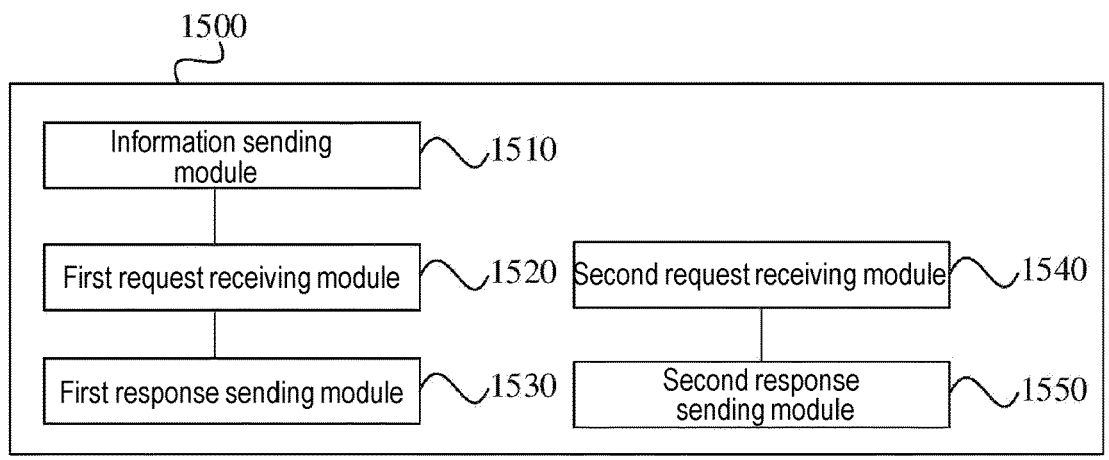
FIG. 16 is a block diagram of a random access resource configuration apparatus provided in yet another embodiment of the disclosure.

In an exemplary embodiment, as shown in FIG. 16, the terminal device belongs to the first type terminal device. The apparatus 1500 further includes a first request receiving module 1520, which is used to receive a first random access request sent by the terminal device using the first random access resource pool.

In an exemplary embodiment, as shown in FIG. 16, the apparatus 1500 further includes a first response sending module 1530, which is used to send a first random access response to the terminal device. The first random access response includes a relative TA value configured for the first type terminal device. The relative TA value is used to determine an actual TA value of the first type terminal device.

In an exemplary embodiment, as shown in FIG. 16, the terminal device belongs to the second type terminal device. The apparatus 1500 further includes a second request receiving module 1540, which is used to receive a second random access request sent by the terminal device using the second random access resource pool.

In an exemplary embodiment, as shown in FIG. 16, the apparatus 1500 further includes a second response sending module 1550, which is used to send a second random access response to the terminal device. The second random access response includes a relative TA value configured for the second type terminal device. The relative TA value is used to determine an actual TA value of the second type terminal device.

In summary, in the technical solution provided in the embodiment of the disclosure, the first configuration information is sent to the terminal device through the network device, the first configuration information includes the first random access resource pool configured for the first type terminal device and the second random access resource pool configured for the second type terminal device, and the random access resource configuration method is provided. Furthermore, in the technical solution provided in the embodiment of the disclosure, the first type terminal device refers to the terminal device with the TA pre-compensation capability, and the second type terminal device refers to the terminal device without the TA pre-compensation capability. Since the network device provides different resource scheduling policies according to whether the terminal device has the TA pre-compensation capability, through configuring different random access resources for terminal devices with different capabilities, after receiving the random access request of the terminal device, the network device can distinguish whether the terminal device has the TA pre-compensation capability according to different random access resources used by the random access request, thereby using the corresponding resource scheduling policy to perform resource scheduling on the terminal device in a targeted manner, which improves the accuracy and pertinence of resource scheduling performed by the network device, and also improves the utilization of random access resources.

It should be noted that the functions implemented by the apparatus provided in the above embodiment are only exemplified and illustrated by the division of the various functional modules above. In practical applications, the above functions may be allocated to different functional modules according to actual requirements, that is, the content structure of the device is divided into different functional modules to complete all or part of the above functions.

Regarding the apparatus in the above embodiment, the specific manner in which each module executes operations has been described in detail in the method embodiment and will not be described in detail here.

Figure 17:
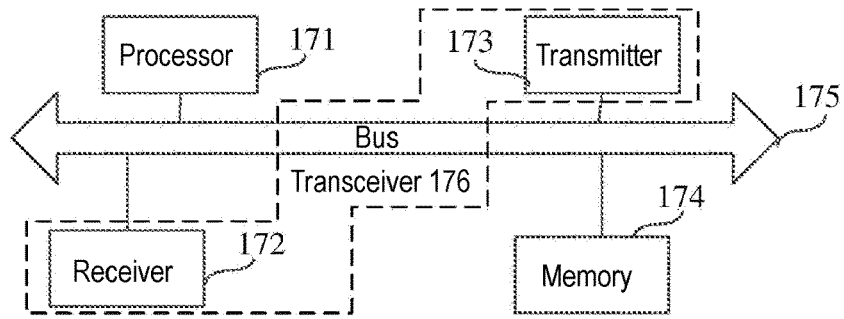
FIG. 17 is a structural block diagram of a terminal device provided in an embodiment of the disclosure.

Please refer to FIG. 17, which shows a structural schematic diagram of a terminal device 170 provided in an embodiment of the disclosure. For example, the terminal device may be the terminal device described above, which is used to execute the random access resource configuration method on a terminal device side. Specifically, the terminal device 170 may include a processor 171, a receiver 172, a transmitter 173, a memory 174, and a bus 175.

The processor 171 includes one or more processing cores, and the processor 171 executes various functional applications and information processing through running a software program and a module.

The receiver 172 and the transmitter 173 may be implemented as a transceiver 176, and the transceiver 176 may be a communication chip.

The memory 174 is connected to the processor 171 through the bus 175.

The memory 174 may be used to store a computer program, and the processor 171 is used to execute the computer program to implement various steps executed by the terminal in the above method embodiment.

In addition, the memory 174 may be implemented by any type of volatile or non-volatile storage device or a combination thereof. The volatile or non-volatile storage device includes, but is not limited to, a random access memory (RAM) and a read-only memory (ROM), an erasable programmable read-only memory (EPROM), an electrically erasable programmable read-only memory (EEPROM), a flash memory or other solid state storage technology, a compact disc read-only memory (CD-ROM), a digital video disc (DVD) or other optical storage, a cassette, a tape, a disk storage or other magnetic storage devices.

The transceiver 176 is used to receive first configuration information sent by the network device. The first configuration information includes a first random access resource pool configured for a first type terminal device and a second random access resource configured for a second type terminal device pool. The first type terminal device refers to a terminal device with a timing advance (TA) pre-compensation capability, the second type terminal device refers to a terminal device without the TA pre-compensation capability, and the first random access resource pool and the second random access resource pool are different.

Optionally, the first random access resource pool includes a first time-frequency resource, the second random access resource pool includes a second time-frequency resource, and the first time-frequency resource and the second time-frequency resource do not have any overlapping region.

Optionally, the first time-frequency resource includes a first time domain resource, the second time-frequency resource includes a second time domain resource, and the first time domain resource and the second time domain resource do not have any overlapping region in the time domain.

Optionally, the first time-frequency resource includes a first frequency domain resource, the second time-frequency resource includes a second frequency domain resource, and the first frequency domain resource and the second frequency domain resource do not have any overlapping region in the frequency domain.

Optionally, the first time-frequency resource includes a first time domain resource and a first frequency domain resource, the second time-frequency resource includes a second time domain resource and a second frequency domain resource, and the first time domain resource and the second time domain resource do not have any overlapping region in the time domain and/or the first frequency domain resource and the second frequency domain resource do not have any overlapping region in the frequency domain.

Optionally, a time interval between any adjacent random access channel occasions (ROs) in the second time domain resource is greater than or equal to the length of a random access channel (RACH) receiving window of the network device.

Optionally, a time domain distribution density of ROs in the first time domain resource is greater than a time domain distribution density of ROs in the second time domain resource.

Optionally, the first random access resource pool includes a first preamble set, the second random access resource pool includes a second preamble set, and the first preamble set and the second preamble set do not have the same preamble.

Optionally, the first configuration information refers to cell common configuration information, and the first configuration information is carried in system information.

Optionally, the terminal device belongs to the first type terminal device. The transceiver 176 is used to send a first random access request to the network device using the first random access resource pool.

Optionally, the processor 171 is used to determine a TA pre-compensation value. The TA pre-compensation value is used to perform TA pre-compensation when sending the first random access request.

Optionally, in the case where the terminal device has a positioning capability, the TA pre-compensation value is an estimated TA value determined by the terminal device according to the positioning capability.

Optionally, in the case where the terminal device does not have the positioning capability, the TA pre-compensation value is a common TA value.

Optionally, the transceiver 176 is used to receive a first random access response sent by the network device. The first random access response includes a relative TA value configured for the first type terminal device. The processor 171 is used to determine an actual TA value according to the TA pre-compensation value and the relative TA value.

Optionally, the terminal device belongs to the second type terminal device. The transceiver 176 is used to send a second random access request to the network device using the second random access resource pool.

Optionally, the transceiver 176 is used to receive the second random access response sent by the network device. The second random access response includes a relative TA value configured for the second type terminal device. The processor 171 is used to determine an actual TA value according to the common TA value and the relative TA value.

Figure 18:
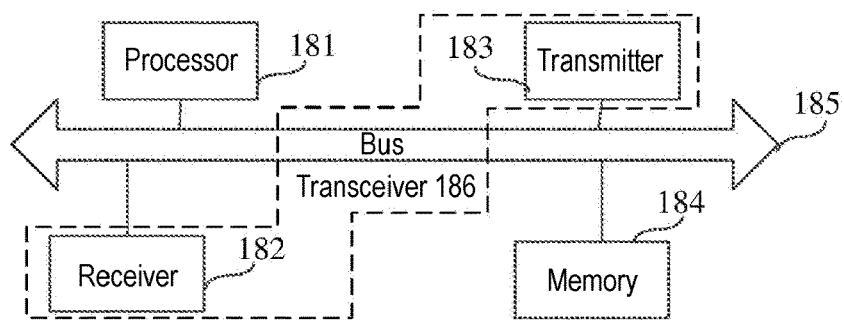
FIG. 18 is a structural block diagram of a terminal device provided in another embodiment of the disclosure.

Please refer to FIG. 18, which shows a structural schematic diagram of a network device 180 provided in an embodiment of the disclosure. For example, the network device may be the network device described above, which is used to execute the random access resource configuration method on a network device side. Specifically, the network device 180 may include a processor 181, a receiver 182, a transmitter 183, a memory 184, and a bus 185.

The processor 181 includes one or more processing cores, and the processor 181 executes various functional applications and information processing through running a software program and a module.

The receiver 182 and the transmitter 183 may be implemented as a transceiver 186, and the transceiver 186 may be a communication chip.

The memory 184 is connected to the processor 181 through the bus 185.

The memory 184 may be used to store a computer program, and the processor 181 is used to execute the computer program to implement various steps executed by the terminal in the above method embodiment.

In addition, the memory 184 may be implemented by any type of volatile or non-volatile storage device or a combination thereof. The volatile or non-volatile storage device includes, but is not limited to, a random access memory (RAM) and a read-only memory (ROM), an erasable programmable read-only memory (EPROM), an electrically erasable programmable read-only memory (EEPROM), a flash memory or other solid state storage technology, a compact disc read-only memory (CD-ROM), a digital video disc (DVD) or other optical storage, a cassette, a tape, a disk storage or other magnetic storage devices.

The transceiver 176 is used to send first configuration information to the terminal device. The first configuration information includes a first random access resource pool configured for a first type terminal device and a second random access resource pool configured for a second type terminal device. The first type terminal device refers to a terminal device with a timing advance (TA) pre-compensation capability, the second type terminal device refers to a terminal device without the TA pre-compensation capability, and the first random access resource pool and the second random access resource pool are different.

Optionally, the first random access resource pool includes a first time-frequency resource, the second random access resource pool includes a second time-frequency resource, and the first time-frequency resource and the second time-frequency resource do not have any overlapping region.

Optionally, the first time-frequency resource includes a first time domain resource, the second time-frequency resource includes a second time domain resource, and the first time domain resource and the second time domain resource do not have any overlapping region in the time domain.

Optionally, the first time-frequency resource includes a first frequency domain resource, the second time-frequency resource includes a second frequency domain resource, and the first frequency domain resource and the second frequency domain resource do not have any overlapping region in the frequency domain.

Optionally, the first time-frequency resource includes a first time domain resource and a first frequency domain resource, the second time-frequency resource includes a second time domain resource and a second frequency domain resource, and the first time domain resource and the second time domain resource do not have any overlapping region in the time domain and/or the first frequency domain resource and the second frequency domain resource do not have any overlapping region in the frequency domain.

Optionally, a time interval between any adjacent random access channel occasions (ROs) in the second time domain resource is greater than or equal to the length of a random access channel (RACH) receiving window of the network device.

Optionally, a time domain distribution density of ROs in the first time domain resource is greater than a time domain distribution density of ROs in the second time domain resource.

Optionally, the first random access resource pool includes a first preamble set, the second random access resource pool includes a second preamble set, and the first preamble set and the second preamble set do not have the same preamble.

Optionally, the first configuration information refers to cell common configuration information, and the first configuration information is carried in system information.

Optionally, the terminal device belongs to the first type terminal device. The transceiver 176 is used to receive a first random access request sent by the terminal device using the first random access resource pool.

Optionally, the transceiver 176 is used to send a first random access response to the terminal device. The first random access response includes a relative TA value configured for the first type terminal device. The relative TA value is used to determine an actual TA value of the first type terminal device.

Optionally, the terminal device belongs to the second type terminal device. The transceiver 176 is used to receive a second random access request sent by the terminal device using the second random access resource pool.

Optionally, the transceiver 176 is used to send a second random access response to the terminal device. The second random access response includes a relative TA value configured for the second type terminal device. The relative TA value is used to determine an actual TA value of the second type terminal device.

An embodiment of the disclosure further provides a computer-readable storage medium, a computer program is stored in the storage medium, and the computer program is used to be executed by a processor of a terminal device to implement the random access resource configuration method on a terminal device side.

An embodiment of the disclosure further provides a computer-readable storage medium, a computer program is stored in the storage medium, and the computer program is used to be executed by a processor of a network device to implement the random access resource configuration method on a network device side.

An embodiment of the disclosure further provides a chip, the chip includes a programmable logic circuit and/or a program command, and when the chip is run on a terminal device, the random access resource configuration method on a terminal device side is implemented.

An embodiment of the disclosure further provides a chip, the chip includes a programmable logic circuit and/or a program command, and when the chip is run on a network device, the random access resource configuration method on a network device side is implemented.

The disclosure also provides a computer program product, and when the computer program product is run on a computer on a terminal device side, the computer executes the random access resource configuration method on the terminal device side.

The disclosure also provides a computer program product, and when the computer program product is run on a computer on a network device side, the computer executes the random access resource configuration method on the network device side.

Persons skilled in the art should understand that in one or more of the above examples, the functions described in the embodiments of the disclosure may be implemented by hardware, software, firmware, or any combination thereof. When implemented in software, the functions may be stored in a computer-readable medium or transmitted as one or more commands or code in the computer-readable medium. The computer-readable medium includes a computer storage medium and a communication medium, wherein the communication medium includes any medium that facilitates the transfer of a computer program from one place to another place. The storage medium may be any available medium that may be accessed by a general purpose or specific purpose computer.

The above descriptions are only exemplary embodiments of the disclosure and are not intended to limit the disclosure. Any modifications, equivalent replacements, improvements, etc. made within the spirit and principle of the disclosure shall be included in the protection scope of the disclosure.

What is claimed is:

1. A random access resource configuration method, applied in a terminal device, the method comprising:
    receiving first configuration information sent by a network device, wherein the first configuration information comprises a first random access resource pool configured for a first type terminal device and a second random access resource pool configured for a second type terminal device,
    wherein the first type terminal device refers to a terminal device with a timing advance (TA) pre-compensation capability, the second type terminal device refers to a terminal device without the TA pre-compensation capability, and the first random access resource pool and the second random access resource pool are different;
    wherein the first random access resource pool comprises a first time-frequency resource, the second random access resource pool comprises a second time-frequency resource;
    wherein the first time-frequency resource and the second time-frequency resource do not have any overlapping region, wherein the first time-frequency resource comprises a first time domain resource and a first frequency domain resource, the second time-frequency resource comprises a second time domain resource and a second frequency domain resource;
    wherein the first time domain resource and the second time domain resource do not have any overlapping region in a time domain and/or the first frequency domain resource and the second frequency domain resource do not have any overlapping region in a frequency domain; and
    wherein a time interval between any adjacent random access channel occasions (ROs) in the second time domain resource is greater than or equal to a length of a random access channel (RACH) receiving window of the network device.

2. The method according to claim 1, wherein a time domain distribution density of ROs in the first time domain resource is greater than a time domain distribution density of ROs in the second time domain resource.

3. The method according to claim 1, wherein the first random access resource pool comprises a first preamble set, the second random access resource pool comprises a second preamble set, and
    the first preamble set and the second preamble set do not have a same preamble.

4. The method according to claim 1, wherein the first configuration information refers to cell common configuration information, and the first configuration information is carried in system information.

5. The method according to claim 1, wherein the terminal device belongs to the first type terminal device, the method further comprising:
    sending a first random access request to the network device by using the first random access resource pool.

6. The method according to claim 5, further comprising:
    determining a TA pre-compensation value, wherein the TA pre-compensation value is used to perform TA pre-compensation when sending the first random access request.

7. The method according to claim 6, wherein in a case where the terminal device has a positioning capability, the TA pre-compensation value is an estimated TA value determined by the terminal device according to the positioning capability,
    wherein in a case where the terminal device does not have a positioning capability, the TA pre-compensation value is a common TA value, wherein the method further comprises:
    receiving a first random access response sent by the network device, wherein the first random access response comprises a relative TA value configured for the first type terminal device; and
    determining an actual TA value according to the TA pre-compensation value and the relative TA value.

8. The method according to claim 1, wherein the terminal device belongs to the second type terminal device, the method further comprising:
- sending a second random access request to the network device by using the second random access resource pool;
- receiving a second random access response sent by the network device, wherein the second random access response comprises a relative TA value configured for the second type terminal device; and
- determining an actual TA value according to a common TA value and the relative TA value.

9. A random access resource configuration method, applied in a network device, the method comprising:
- sending first configuration information to a terminal device, wherein the first configuration information comprises a first random access resource pool configured for a first type terminal device and a second random access resource pool configured for a second type terminal device,
- wherein the first type terminal device refers to a terminal device with a timing advance (TA) pre-compensation capability, the second type terminal device refers to a terminal device without the TA pre-compensation capability, and the first random access resource pool and the second random access resource pool are different;
- wherein the first random access resource pool comprises a first time-frequency resource, the second random access resource pool comprises a second time-frequency resource;
- wherein the first time-frequency resource and the second time-frequency resource do not have any overlapping region, wherein the first time-frequency resource comprises a first time domain resource and a first frequency domain resource, the second time-frequency resource comprises a second time domain resource and a second frequency domain resource;
- wherein the first time domain resource and the second time domain resource do not have any overlapping region in a time domain and/or the first frequency domain resource and the second frequency domain resource do not have any overlapping region in a frequency domain; and
- wherein a time interval between any adjacent random access channel occasions (ROs) in the second time domain resource is greater than or equal to a length of a random access channel (RACH) receiving window of the network device.

10. The method according to claim 9, wherein a time domain distribution density of ROs in the first time domain resource is greater than a time domain distribution density of ROs in the second time domain resource.

11. The method according to claim 9, wherein the first random access resource pool comprises a first preamble set, the second random access resource pool comprises a second preamble set, and
- the first preamble set and the second preamble set do not have a same preamble.

12. The method according to claim 9, wherein the first configuration information refers to cell common configuration information, and the first configuration information is carried in system information.

13. The method according to claim 9, wherein the terminal device belongs to the first type terminal device, the method further comprising:
- receiving a first random access request sent by the terminal device using the first random access resource pool,
- sending a first random access response to the terminal device, wherein the first random access response comprises a relative TA value configured for the first type terminal device, and the relative TA value is used to determine an actual TA value of the first type terminal device.

14. The method according to claim 9, wherein the terminal device belongs to the second type terminal device, the method further comprising:
- receiving a second random access request sent by the terminal device using the second random access resource pool.

15. The method according to claim 14, further comprising:
- sending a second random access response to the terminal device, wherein the second random access response comprises a relative TA value configured for the second type terminal device, and the relative TA value is used to determine an actual TA value of the second type terminal device.

16. A random access resource configuration apparatus, applied in a terminal device, the apparatus comprising:
- an information receiving module, used to receive first configuration information sent by a network device, wherein the first configuration information comprises a first random access resource pool configured for a first type terminal device and a second random access resource pool configured for a second type terminal device,
- wherein the first type terminal device refers to a terminal device with a timing advance (TA) pre-compensation capability, the second type terminal device refers to a terminal device without the TA pre-compensation capability, and the first random access resource pool and the second random access resource pool are different;
- wherein the first random access resource pool comprises a first time-frequency resource, the second random access resource pool comprises a second time-frequency resource;
- wherein the first time-frequency resource and the second time-frequency resource do not have any overlapping region, wherein the first time-frequency resource comprises a first time domain resource and a first frequency domain resource, the second time-frequency resource comprises a second time domain resource and a second frequency domain resource;
- wherein the first time domain resource and the second time domain resource do not have any overlapping region in a time domain and/or the first frequency domain resource and the second frequency domain resource do not have any overlapping region in a frequency domain; and
- wherein a time interval between any adjacent random access channel occasions (ROs) in the second time domain resource is greater than or equal to a length of a random access channel (RACH) receiving window of the network device.

* * * * *